(12) United States Patent
Bard et al.

(10) Patent No.: US 11,833,783 B2
(45) Date of Patent: Dec. 5, 2023

(54) LAMINATED GLAZING AND METHODS OF LAMINATING A GLAZING

(71) Applicant: ACR II GLASS AMERICA INC., Nashville, TN (US)

(72) Inventors: Michael Bard, Wadern (DE); Steven Scott Christman, Nashville, TN (US); Christina Marie Youngers, Nashville, TN (US); Shelby Morgan Rogers, Nashville, TN (US); Brad Jonathan Barnes, Chapmansboro, TN (US)

(73) Assignee: ACR II GLASS AMERICA INC., Nashville, TN (US)

( * ) Notice: Subject to any disclaimer, the term of this patent is extended or adjusted under 35 U.S.C. 154(b) by 432 days.

(21) Appl. No.: 17/025,145

(22) Filed: Sep. 18, 2020

(65) Prior Publication Data

US 2021/0078295 A1    Mar. 18, 2021

Related U.S. Application Data

(60) Provisional application No. 62/901,864, filed on Sep. 18, 2019.

(51) Int. Cl.
*B32B 37/10* (2006.01)
*B32B 17/10* (2006.01)
*B60J 1/02* (2006.01)

(52) U.S. Cl.
CPC .. *B32B 17/10036* (2013.01); *B32B 17/10871* (2013.01); *B32B 17/10972* (2013.01); *B32B 37/1018* (2013.01); *B60J 1/02* (2013.01)

(58) Field of Classification Search
None
See application file for complete search history.

(56) References Cited

U.S. PATENT DOCUMENTS

| | | | |
|---|---|---|---|
| 6,410,120 | B1 | 6/2002 | Frost et al. |
| 8,357,451 | B2 | 1/2013 | Hino |
| 10,265,931 | B2 | 4/2019 | Mellor et al. |
| 2003/0111160 | A1 | 6/2003 | Bolognese et al. |
| 2019/0168488 | A1 | 6/2019 | Manz et al. |

FOREIGN PATENT DOCUMENTS

| | | |
|---|---|---|
| DE | 19622566 C1 | 11/1997 |
| JP | 2008303084 A | 12/2008 |
| WO | 2010119770 A1 | 10/2010 |
| WO | 2010119771 A1 | 10/2010 |

*Primary Examiner* — Christopher T Schatz
(74) *Attorney, Agent, or Firm* — K&L Gates LLP

(57) ABSTRACT

A method according to this disclosure includes stacking a first glass sheet, a first interlayer, a film, a second interlayer, and a second glass sheet to provide a lamination stack, wherein the film has a first film edge that is a first distance from a first edge of the lamination stack to provide a first film cutback; deairing the lamination stack; and autoclaving the lamination stack to provide the laminated glazing, wherein the film shrinks during autoclaving wherein a seal formed during deairing is sufficient such that no air is introduced to the lamination stack during autoclaving and no air is left in the laminated glazing.

11 Claims, 4 Drawing Sheets

LAMINATED GLAZING AND METHODS OF LAMINATING A GLAZING

CROSS REFERENCE TO RELATED APPLICATION

This application claims priority to U.S. Provisional Patent Application No. 62/901,864 filed Sep. 18, 2019, entitled "METHODS OF LAMINATING A GLAZING," the content of which is incorporated by reference herein in its entirety.

TECHNICAL FIELDS

The present disclosure relates generally to laminated glazings having, a film laminated therein and methods for preparing such a laminated glazing.

BACKGROUND

Laminated glazings may be used for various purposes, including architectural and automotive applications. Laminated glazings known in the art may include a film laminated therein, such as films that include carriers and coatings which provide a function to the laminated glazing. Functional films, for example, may be used to provide a printed pattern, heat control, or head-up displays (HUDs). In some glazings, a laminated film may include a switchable function, such as a polymer dispersed liquid crystal (PDLC) film. Where a film is laminated, multiple adhesive layers may be used around the film between glass substrates. Production of multiple layers may lead to air between the layers which may negatively affect a final laminated glazing. It is thus desirable to provide laminated glazings, including those with a laminated film, which do not have air within the glazing.

SUMMARY OF THE DISCLOSURE

Disclosed herein is a method of preparing a laminated glazing comprising stacking a first glass sheet, a first interlayer, a film, a second interlayer, and a second glass sheet to provide a lamination stack, wherein the film has a film edge that is a first distance from a first edge of the lamination stack, wherein the first distance comprises a first film cutback and deairing the lamination stack, wherein during deairing, the first and second interlayers form a seal extending the from the first edge of the lamination stack to an inner seal point, wherein a void is provided in the lamination stack between the inner seal point and the first film edge. The method further comprising autoclaving the lamination stack to provide the laminated glazing, wherein the film shrinks during autoclaving such that a second distance between the first film edge after shrinking and a first edge of the laminated glazing is more than the first film cutback, wherein the first edge of the laminated glazing comprises the first edge of the lamination stack after autoclaving, wherein the void is eliminated during autoclaving and wherein the seal is sufficient such that no air is introduced to the lamination stack during autoclaving and no air is left in the laminated glazing.

In some embodiments, the film may shrink at least 0.5% in at least one direction during autoclaving. The film may shrink 5.0% or less in at least one direction during autoclaving. In certain embodiments, the first film cutback may be at least 12 mm. The seal may extend at least 7 mm from the edge of the lamination stack after deairing.

The lamination stack may include four edges wherein the first lamination stack edge is opposite the second edge of the lamination stack and the third edge of the lamination stack is opposite the fourth edge of the lamination stack. Cutback of the laminated film may be substantially the same at the third and fourth edges of the lamination stack. In some embodiments, the film may shrink more in a direction between the first and second edges of the lamination stack than in a direction between the second and third edges of the lamination stack. The film cutback along the first and second lamination stack edges may be larger than along the third and fourth lamination stack edges.

Further disclosed herein is a laminated glazing comprising a first glass sheet, a first interlayer, a film which is at least 0.5% smaller in at least one direction than the film was prior to lamination, a second interlayer, and a second glass sheet, wherein a first edge of the film is a first distance from a first edge of the laminated glazing, wherein the first edge of the film is within the laminated glazing, wherein the first distance is at least 12 mm, and wherein the first distance is sufficient such that no air is introduced into the laminated glazing.

In some embodiments, the glazing may be an automotive glazing, such as a windshield. The film may have a second edge that is a second distance from a second edge of the laminated glazing, and the first distance may be the same or different from the second distance. The film may further have third and fourth edges which are a third distance from a third edge of the laminated glazing and a fourth distance from the fourth edge of the laminated glazing, respectively. In certain embodiments, the first film edge may be opposite the second film edge, and the third film edge may be opposite the fourth film edge. The third distance and the fourth distance may be substantially the same. In some embodiments, the film may shrink more in a first direction than in a second direction. The first direction may extend between the first film edge and the second film edge. Further, the first and second distances may be equal to or larger than the third and fourth distances. The laminated glazing may further include an obscuration in the periphery of the laminated glazing.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
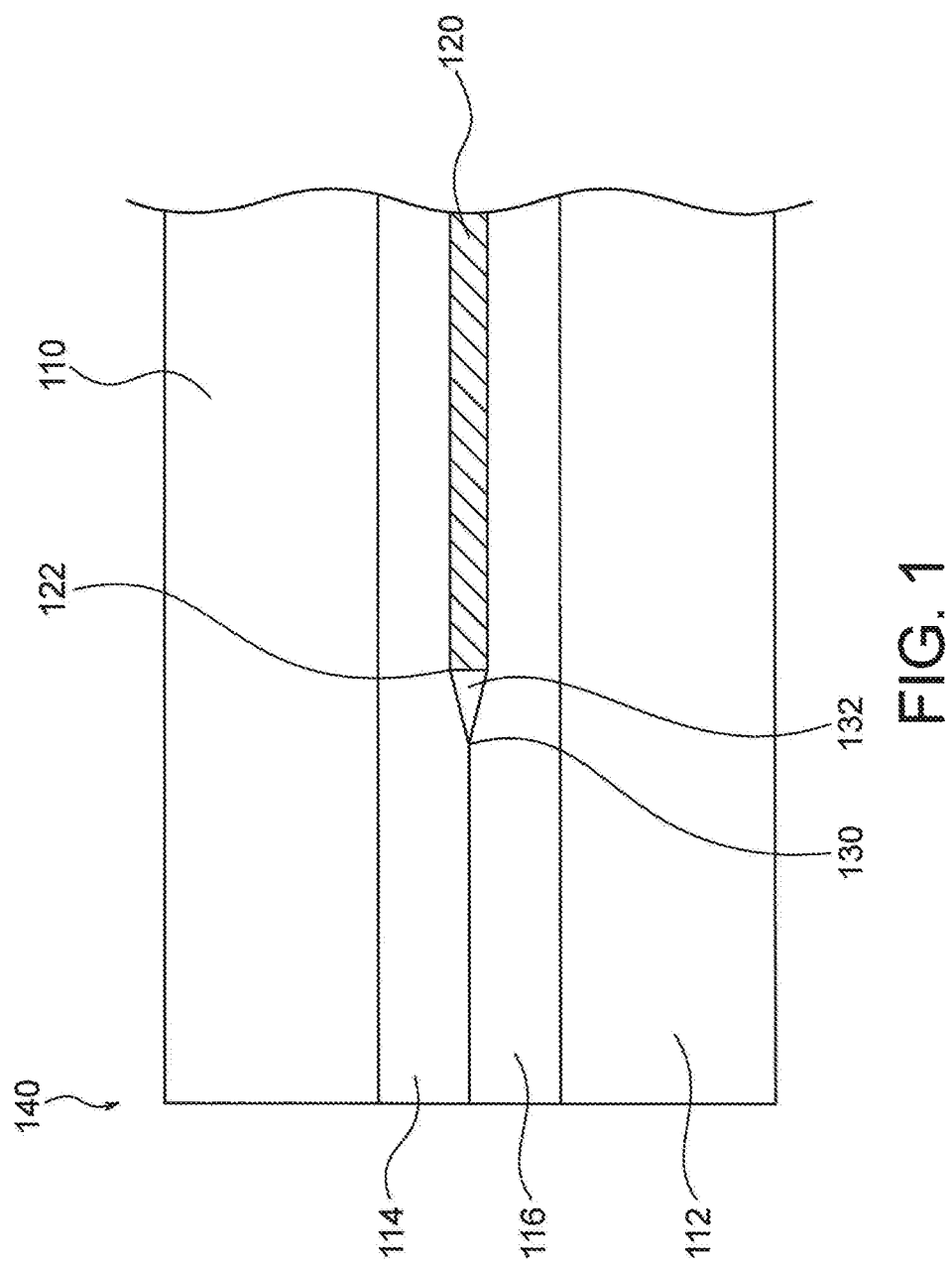
FIG. 1 illustrates a cross-sectional view of a lamination stack, according to an exemplary embodiment of the present disclosure.

Disclosed herein are exemplary aspects of a laminated glazing having a film laminated therein having improved lamination quality and methods of preparing such glazings. In the following description, for purposes of explanation, specific details are set forth in order to promote a thorough understanding of one or more aspects of the disclosure. It may be evident in some or all instances, however, that many aspects described below can be practiced without adopting the specific design details described below.

As used herein, the term "S1" may refer to the exterior glass sheet surface in an automotive application. The term "S4" may refer to the interior glass sheet surface of a laminated automotive product. "S2" may be a glass sheet surface opposite S1, and "S3" may be a glass sheet surface opposite S4. In a laminated glazing, S2 and S3 may be a part of the laminate interior, facing each other.

A conventional laminated glazing may include a first glass sheet, an interlayer, and a second glass sheet laminated together. The glass sheets, which may include, but is not limited to, a soda-lime glass as described in ISO 16293-1: 2008, may be bent to a desired shape prior to lamination with an interlayer therebetween. Glass bending may preferably occur by heat treatment from 560° C. to 700° C., more preferably from 580° C. to 660° C.

An interlayer may include a polymer adhesive, such as polyvinyl butyral (PVB) or any other suitable laminating material, including ethylene vinyl acetate (EVA). The glass sheets and interlayer may be stacked to provide a lamination stack which may then be deaired prior to autoclaving. The deairing process may use mechanical pressure and/or vacuum to remove air from between the glass sheets. In some laminated glazings, the interlayer may have an embossed surface which may facilitate removal of air in the lamination stack. The embossing may provide pathways for the air to reach a lamination stack edge to improve air removal. The interlayer may seal together the lamination stack layers such that no additional air may be introduced into the lamination stack. After deairing, including sealing at the interlayer, there may be some air remaining in the stack which may be dissolved into the interlayer material during an autoclave cycle, which may include high pressure and temperature (such as 10 to 15 bar, and 110° C. to 160° C.).

Some laminated glazings may further include a film laminated between the first and second glass sheets. Particularly, a film may be positioned between two interlayers positioned between two glass sheets. A film may be used for various applications, including heat control, a printed pattern, or a HUD. The film may be any suitable material, including polyethylene terephthalate (PET), polycarbonate (PC), polyurethane (PU), polystyrene (PS), cellulose triacetate (TAC), or others, and may include a coating or print thereon or other additional layers. Where a film is laminated between interlayers, the interlayers may not have the same embossing as an interlayer between two glass sheets without a laminated film. Particularly, an interlayer may have no embossing or a lighter embossing texture on the interlayer surface adjacent to the film as compared to an interlayer in a glazing without a laminated film. The lighter embossing texture may be a smoother, shallower embossed surface and may provide an improved lamination which has fewer wrinkles in the film than a typical embossing pattern which may provide space for the film to move within the embossing during lamination. As such, the lighter embossed surface texture may include smaller embossed portions and may not allow for as much air to flow out of the lamination stack once the interlayer begins to adhere to the laminated film when compared to a typical, heavier embossed surface.

Among other aspects, the present disclosure relates to a laminated glazing wherein a film laminated therein is cut back from the glazing edge such that interlayers on either side of the film may seal together around the film edge during a deairing process to a degree that air does not penetrate the lamination stack during an autoclave process.

As used herein, the distance between a film edge and laminated stack edge is referred to as a film cutback. Film cutback may be desirable to prevent wrinkles or defects in the film appearance in a laminated glazing. During a deairing process, which may include a vacuum and heating, air may be removed from the lamination stack and the interlayers may adhere to each other, the glass sheets and the film. The vacuum applied to the stack may remove a majority of the air between the stack layers before the interlayers seal the edges of the lamination stack. However, there may be some air remaining in the lamination stack, such as at the film edge within the lamination stack. An air void may be formed at the edge of the film where the interlayers extend past the film edge to meet each other at a distance from the film edge. Particularly, the interlayers may seal to each other at an outer periphery of the glazing. The seal may particularly extend from a lamination stack outer edge to a point near the film edge such that the void exists between the seal and the film edge. The size of the void may depend in part on the thickness of the laminated film. As the thickness of the film increases, the distance between the interlayers increases and the size of the void may increase. Preferably, the film may have a thickness of 1 μm to 300 μm, more preferably 10 μm to 250 μm, and even more preferably from 30 μm to 100 μm. The flexibility of the interlayer may further impact how the interlayers meet as more flexible interlayers may meet closer to a film edge. The interlayer thickness and material may impact the interlayer flexibility. During deairing, the pressure applied to the lamination stack may minimize the void size as pressure pushes the interlayers together. However, the void may be in the glazing until an autoclaving cycle. During autoclaving, the interlayer material may have a viscosity during autoclaving such that the interlayer material flows and fills the volume of the void and any air remaining in the void may dissolve into the interlayer material. However, a laminated film may be provided such that the film shrinks during an autoclaving cycle, which may minimize wrinkles formed in the film during lamination. Where the film shrinks, it may pull on the interlayers and may allow for air to extend between the glass sheets during an autoclave process and there may be air in the laminated glazing resulting therefrom. Further, the air in the void may expand at high temperatures. The air may expand faster than the interlayer material which may create internal pressure against the interlayers and the seal, which may open the seal to introduce air between the glass sheets. Thus it may be desirable to provide a seal which may withstand such pressures.

Some laminated films may shrink due to material structure and/or the film manufacturing process, which may include stretching of the film. Particularly, films used herein may shrink when heated at temperatures of at least 100 degrees Celsius, such as during an autoclave cycle, wherein after an autoclave cycle, the distance from a glazing edge to the film edge within the glazing may be more than the distance between the lamination stack edge and the film edge within the lamination stack prior to autoclaving wherein the glazing edge is the lamination stack edge after autoclaving. The film may shrink preferably at least 0.5% in at least one direction in a laminated glazing, more preferably from at least 1.0%. The film may preferably shrink 5.0% or less in at least one direction in a laminated glazing, more preferably 3.5% or less. The film may have at least two directions, normal to each other, and may shrink in each direction, the same or different amounts. The amount of shrinkage may depend on various factors, such as the material, glass transition temperature, mechanical history, and thermal history of the film. In a laminated glazing, such as a windshield, any curvature in the glazing may affect the film shrinkage, as shrinking may be lessened where curvature of the glass blocks movement of the film.

During lamination, interlayers may adhere to a laminated film and glass sheets in a lamination stack. Where the film shrinks during autoclaving, the shrinking film may pull on the interlayers adhered to the film away from a glazing edge, creating tension in the interlayers. The pull created by such shrinking may pull the interlayers the same and/or different directions than expanding air in a void at the film edge. Where the film edge is at or near the edge of the glazing, air may penetrate the glazing where there is such tension, displacing interlayer material and creating air pockets which may be visible in the laminated glazing. Air between the glass sheets may weaken the glazing and may further infiltrate the glazing over time. Thus, preferably, a laminated glazing having a film laminated therein may have minimal or no air in the laminated glazing. However, as the film shrinks during lamination, including during an autoclave process, air may be introduced to the glazing. The interlayers may adhere to the film before the film shrinks or shrinks completely, including adhesion during a deairing process. As the film shrinks, the film may pull on the interlayers, which may form a vacuum pulling against the seal created at an edge of the lamination stack and increase tension in the interlayers. The amount of shrinkage in the film may relate to the amount of tension caused in the interlayers. Where the interlayer seal at the edge of the glazing is not sufficient in length and strength, the pull, or vacuum, created by the shrinking film and the pressure surrounding the glazing during an autoclave cycle may lead to the introduction of air into the glazing. Where the seal is sufficient at the glazing edge, an outer seal on the edge of the glazing may withstand the pressure and the tension created by the film shrinking, preventing air intrusion in the glazing. The thickness of the interlayers may contribute to the size of the seal needed. A thicker interlayer may more widely distribute the tension caused by a shrinking film compared to a thinner interlayer and may be less likely to allow the introduction of air after film shrinking. A thicker interlayer may include more material to absorb trapped air and fill the void, which may increase as the film shrinks, limiting the need for additional seal length compared to thinner interlayers. However, it may be preferable to include at least one thin adhesive interlayer, for example, to decrease overall thickness of a glazing or to improve the optical qualities of the laminated film. Preferably the interlayers are from 50 μm to 850 μm thick each, and at least one interlayer may be preferably from 100 μm to 500 μm each, even more preferably from 200 μm to 400 μm each. A longer seal may be needed where an interlayer is thinner and the seal may be more affected by tension caused by the shrinking film, including where one interlayer has a thinner construction and another interlayer may have a relatively thicker construction, such as an interlayer having a thickness of more than 500 μm.

High shrinkage in the film may create a relatively higher vacuum pull against the interlayers, increasing the possibility of introducing air between first and second glass sheets. The size of a glazing may further impact the tension formed in the interlayers. Shrinkage of a film may be quantified as a percentage, thus where a film is relatively larger, the film will shrink relatively more. Thus, the cutback required to compensate for a shrinking film may be higher in a windshield than in a relatively smaller side window.

During a lamination process, the seal around the edge of the lamination stack may be measured as it extends from an outer edge of the lamination stack to an inner seal point after deairing. The inner seal point may further be the outermost point of the void prior to autoclaving the lamination stack. Preferably, the inner seal point may be at least 7 mm from a glazing edge, more preferably at least 10 mm, and even more preferably at least 15 mm. As film shrinkage increases, the distance between the lamination stack edge to the inner seal point needed to prevent air infiltration may also increase. The film edge may be a distance from the lamination stack edge further than the inner seal point. The distance between the inner seal point and the film edge may be the length of the void after deairing. The void may have a length of 2 mm to 7 mm, preferably mm to 6 mm. The distance between the outer edge of the lamination stack and the film edge is preferably at least 12 mm, more preferably at least 15 mm, and even more preferably at least 20 mm from at least one edge of the lamination stack.

A glazing may have a number of outer edges in architectural and automotive applications. Particularly, where the glazing is an automotive glazing, the glazing may be a windshield, a side window, a back window, or a sunroof which may have more than one edge. A windshield, for example, may have at least four edges. A laminated film may have a different shrinkage when measured across the film in different directions. For example, a windshield may have a substantially vertical direction and a substantially horizontal direction. The film laminated therein may have a shrinkage in a vertical direction different than a shrinkage of the film in a horizontal direction. Preferably, the film may have a vertical shrinkage greater than or equal to a horizontal shrinkage. In particular embodiments, vertical shrinkage may be more than horizontal shrinkage.

Preferably, the film may shrink in two directions normal to each other, which may include vertical and horizontal directions or any other directions normal to each other. The orientation of the film in a laminated glazing may determine which direction has more shrinkage. The shape of the laminated glazing, including curvature, as well as the film structure, may affect the difference in shrinkage. For example, in a direction having curvature, the film may shrink less as compared to a direction having relatively less curvature. Further, some films may be anisotropic such that the film shrinks differently in different directions independent of a glass shape in a laminated glazing.

When the laminated film shrinks, the film edge may move away from the glazing edge. A film having different amounts of shrinkage in different directions may move away from the glazing edges by different amounts. For example, where a film shrinks more in a vertical direction, the film may move away from the top and bottom edges of a glazing more than from left and right edges of the glazing. Further, the differences in shrinking may provide differences in the tension formed on the interlayer at each edge and the introduction of air at the different edges. As such, the film may not be the same distance from the glazing edge around the entire glazing. The distance between the film edge and the glazing edge may be larger where the film shrinks more away from the edge compared to film edges where the film shrinks relatively less. Where the film shrinks more in a vertical direction extending from an upper film edge to a lower film edge than a horizontal direction extending from a left film edge to a right film edge, the distance from the upper glazing edge to the upper film edge and the lower glazing edge to the lower film edge may be larger than the distance from the right film edge to the right glazing edge and the left film edge to the left glazing edge. In some particular embodiments, the distance between the upper film edge and upper glazing edge may be less than the distance between the lower film edge and the lower glazing edge.

Where a laminated film has an edge inside the outer glazing edge, the film edge may be visible in the glazing. It may be preferable, in some embodiments, to include an obscuration in or on the glazing which may mask the film edge. An obscuration may include any suitable material, including a print on a glass sheet, interlayer or a film in the glazing, a colored interlayer, or a film applied to the glazing. It may be preferable to include an enamel print obscuration on one or more glass surfaces in the laminated glazing. Particularly, an automotive glazing may include a first glass sheet having surfaces S1 and S2 and a second glass sheet having surfaces S3 and S4. In some embodiments, surfaces S2 and/or S4 may include a print around a periphery of the glass sheets which masks the film edge from view of an observer from an interior or exterior position. The print may include a black enamel frit in some embodiments. As disclosed herein, the distance between the glazing edge and the film edge may be such that after the film shrinks, the edge of the film remains in the obscuration area, such that the film edge remains masked by the obscuration.

The film having an edge inside of a laminated glazing edge may be provided in a lamination stack as a bilaminate. Particularly, the film may be prelaminated to an interlayer sheet which may be stacked with an additional interlayer and glass sheets prior to deairing and autoclaving. The edge of the film may be cut away from one or more edges of the bilaminate interlayer such that the interlayer continues past the film edges to the glass edges in the lamination stack.

According to certain embodiments of the present disclosure, a laminated glazing may be prepared by a method including stacking a first glass sheet, a first interlayer, a film, a second interlayer, and a second glass sheet. The film included in the stack may have edges which do not align with edges of the glass sheets and the interlayers. Particularly, the film may have at least one edge in the laminated stack a distance from the lamination stack edge, such that the distance is a film cutback. In some embodiments, more than one film edge may be cutback from the lamination stack edge. The distance between the film edges and the lamination stack edges may be different from each other. Some embodiments may particularly include at least four edges. Where the laminated glazing is a windshield, the glazing may include two edges opposite each other having the same film cutback which may be the same or different from the cutback on other film edges in the glazing. Preferably, a windshield has left and right edges opposite each other which may have the same film cutback. In preparation of such a construction, a film to be laminated may be provided as larger than, the same size as, or smaller than glass sheets to be laminated. The film may be provided in a size to have a desired cutback along the film edges or the film may be trimmed to a desired size. The film cutback along an edge of the lamination stack may be a variable distance such that the shape of the film edge may not be the same as a shape of the lamination stack edge. As disclosed herein, a minimum film cutback may refer to the smallest film cutback along a particular edge of the film.

The lamination stack may then be desired such that a majority of air is removed from the lamination stack. During deairing, a seal may be formed between the interlayers around the film at a lamination stack periphery between a lamination stack edge and an inner seal point. A void, which may be an air pocket, may also be formed during deairing between the inner seal point and the film edge. The lamination stack having a seal may be autoclaved to provide a laminated glazing. Autoclaving may include applying heat and pressure to the lamination stack. The film may shrink during autoclaving such that the distance between the film edge and an edge of the laminated glazing may be more than the distance between the film edge and the lamination stack. The interlayer material may be such that air in the void may be absorbed by the interlayer and eliminated or substantially eliminated from the laminated glazing. The void may be eliminated during autoclaving and the seal may be sufficient such that no air is introduced to the lamination stack during autoclaving and no air is left in the laminated glazing.

In some embodiments, the glazing may be a windshield having first and second edges on a top and bottom and third and fourth edges at the sides of the windshield. The edges may be connected at rounded or non-rounded corners. In particular embodiments, the film may shrink at different amounts between the upper and lower edges than between the left and right edges. The film may be cutback from the lamination stack edges in amounts which may not be the same at all film edges. In certain embodiments, the film cutback may be the same or substantially the same for the left and right edges of the film. The film cutback may be more in the upper and lower edges than the left and right edges where shrinkage of the film is greater in the vertical direction between the upper and lower edges. Particularly with respect to upper and lower edges, the film may be cutback in different amounts in edges opposite each other.

As shown in FIG. 1, a lamination stack prior to autoclaving may have a film 120 between interlayers 114, 116 and glass sheets 110, 112. The film 120 is shown having a film edge 122 within the stack to provide an area at the edge 140 of the stack where the interlayers 114, 116 may seal around the film 120. The edge 140 of the lamination stack may aligned with the edge of the first glass sheet 110 and the second glass sheet 112. One or both of the interlayers 114, 115 may align with the edge 140 of the lamination stack or extend past the edge 140 of the lamination stack. The excess interlayer material may be trimmed to the edge of the laminated glazing after an autoclaving process. Prior to autoclaving, the seal may extend from an edge 140 of the lamination stack to an inner seal point 130. A void 132 may be formed between the inner seal point 130 and the film edge 122. The void 132 may be filled with air which, as discussed herein, may be absorbed by the interlayers 114, 116 during an autoclave cycle. The thickness of the film 120 may prevent the seal from reaching the film edge 122 and cause the formation of such a void 132 at the film edge 122. During autoclaving, at high temperatures, the film 120 may shrink which may pull on the interlayers 114, 116 and increase the void 132 and/or introduce air at the stack edge 140 where the seal does not have proper strength to withstand the shrinking film 120 and pressure in the autoclave. As disclosed herein, some embodiments may have a film edge 122 far enough from the lamination stack edge 140 to provide a seal between interlayers 114, 116 after deairing that withstands film 120 shrinkage during an autoclave cycle. The length of the seal may provide sufficient strength in the interlayers 114, 116 to prevent tearing of the seal.

Figure 2:
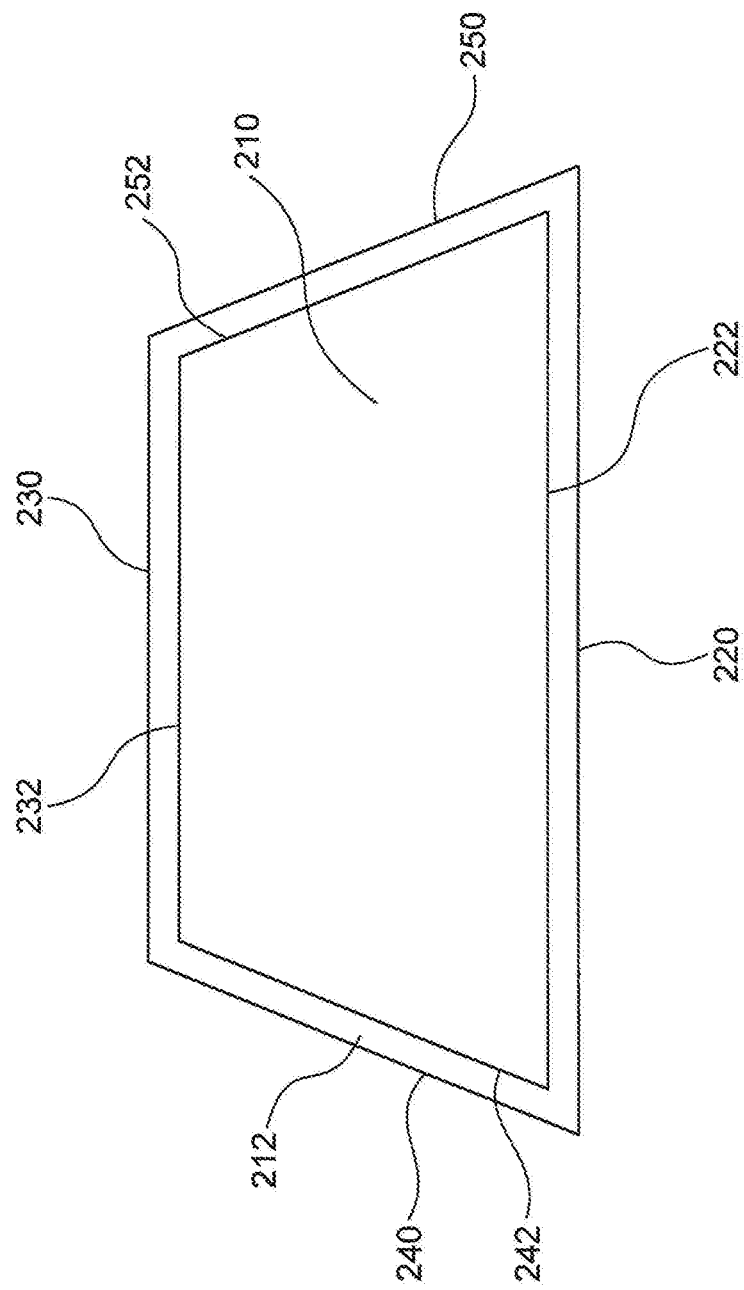
FIG. 2 illustrates a lamination stack, according to an exemplary embodiment of the present disclosure.
Figure 3:
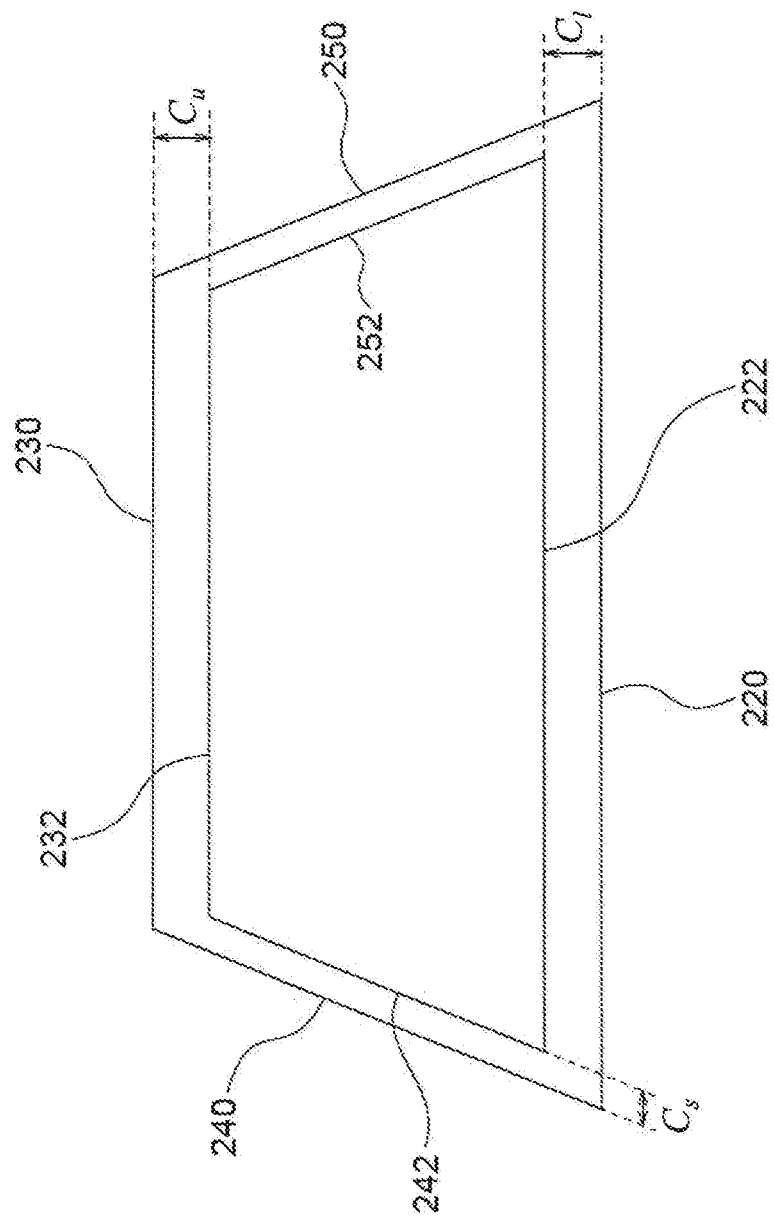
FIG. 3 illustrates a lamination stack, according to an exemplary embodiment of the present disclosure.
Figure 4:
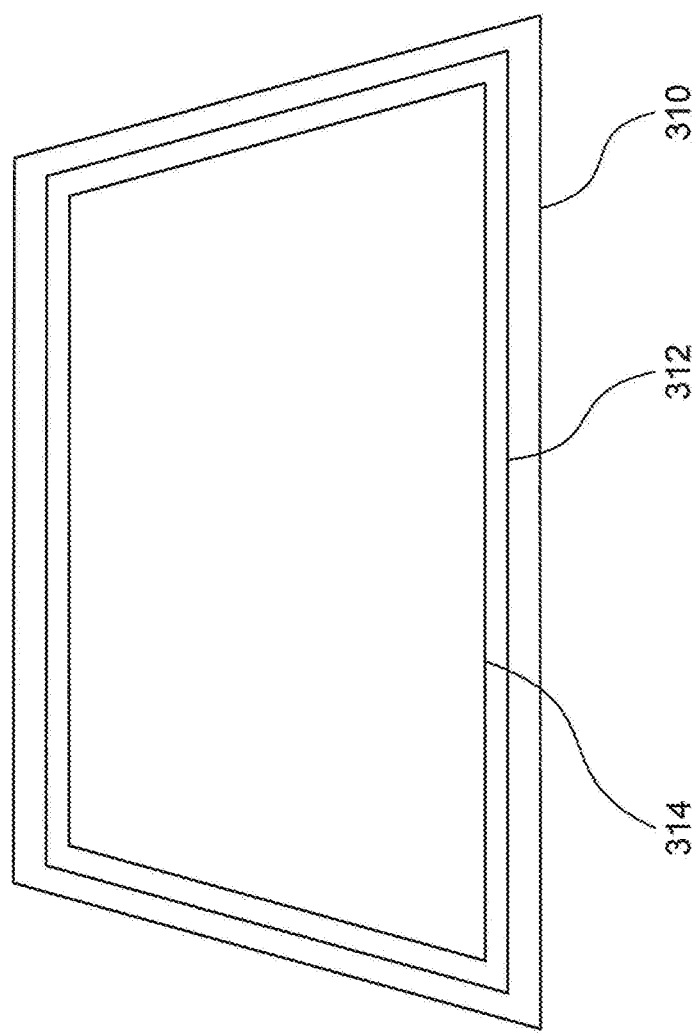
FIG. 4 illustrates a laminated glazing, according to an exemplary embodiment of the present disclosure.

FIG. 2 illustrates a lamination stack having a film 210 therein. The lamination stack has outer edges 220, 230, 240, 250 and the film 210 as shown has film edges 222, 232, 242, 252 aligned with the outer edges 220, 230, 240, 250, respectively. The lamination stack may have an area 212 between the lamination stack edges 220, 230, 240, 250 and the film edges 222, 232, 242, 252. The area 212 may include a seal and a void 132 as shown in FIG. 1. The seal may be continuous around a lamination stack edge 140, and the void 132 may be continuous around the film edge 122. The distance between each lamination stack edge 220, 230, 240, 250 and each respective film edge 222, 232, 242, 252 may be a film cutback. The distance between an upper film edge 232 and an upper lamination stack edge 230 may be an upper cutback $C_u$, as shown in FIG. 3. The distance between a lower film edge 222 and a lower lamination stack edge 220 may be a lower cutback $C_l$. In some embodiments, the upper cutback $C_u$ may be the same or different from the lower cutback $C_l$. In some glazings, an opaque print around the periphery of the glazing may be larger along a lower edge 220, which may provide for a larger lower cutback $C_l$ without the lower film edge 222 being visible in the laminated glazing. Regarding the left and right sides of the lamination stack, the distance between a side edge of the lamination stack 240 and a side film edge 242 may be a side cutback $C_s$. The side cutback $C_s$ may be preferably the same on left and right sides of the lamination stack but may be different from each other in some embodiments. The distance between each lamination stack edge 220, 230, 240, 250 and each respective film edge 222, 232, 242, 252 may increase after autoclaving when the film may shrink. The change in distance after autoclaving may be the same or different at each edge. FIG. 4 illustrates a glazing according to an embodiment herein having a film edge 312 between a glazing edge 310 and an obscuration edge 314. The obscuration may include a print and may mask the film edge 312 such that the film edge 312 is not visible from at least one direction, such as from the vehicle exterior or interior.

In the description above, for purposes of explanation and not limitation, the examples with specific details are set forth to provide a thorough understanding of the present disclosure. However, it will be apparent to those having ordinary skill in the art that other embodiments with various modifications and variations may be practiced without departing from the spirit and scope of the present disclosure.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A method of preparing a laminated glazing, comprising:
   stacking a first glass sheet, a first interlayer, a film, a second interlayer, and a second glass sheet to provide a lamination stack, wherein the film has a first film edge that is a first distance from a first edge of the lamination stack, wherein the first distance comprises a first film cutback;
   deairing the lamination stack, wherein during the deairing, the first and second interlayers form a seal extending from the first edge of the lamination stack to an inner seal point, wherein a void is provided in the lamination stack between the inner seal point and the first film edge; and
   autoclaving the lamination stack to provide the laminated glazing,
   wherein the film shrinks during the autoclaving such that a second distance between the first film edge after shrinking and a first edge of the laminated glazing is more than the first film cutback, wherein the first edge of the laminated glazing comprises the first edge of the lamination stack after the autoclaving,
   wherein the void is eliminated during the autoclaving, and
   wherein the seal is sufficient such that no air is introduced to the lamination stack during the autoclaving and no air is left in the laminated glazing.

2. The method according to claim 1, wherein the film shrinks at least 1.0% in at least one direction during the autoclaving.

3. The method according to claim 1, wherein the first film cutback is at least 12 mm.

4. The method according to claim 3, wherein the first film cutback is at least 20 mm.

5. The method according to claim 1, wherein the seal is at least 7 mm in length inward from the first edge of the lamination stack after the deairing.

6. The method according to claim 5, wherein the seal is at least 15 mm in length inward from the first edge of the lamination stack after the deairing.

7. The method according to claim 1, wherein the lamination stack comprises at least the first edge of the lamination stack, a second edge of the lamination stack, a third edge of the lamination stack, and a fourth edge of the lamination stack, wherein the first edge of the lamination stack is opposite the second edge of the lamination stack and the third edge of the lamination stack is opposite the fourth edge of the lamination stack.

8. The method according to claim 7, further comprising a third distance between a second edge of the film and the second edge of the lamination stack, wherein the third distance comprises a second film cutback;
   a fourth distance between a third edge of the film and the third edge of the lamination stack, wherein the fourth distance comprises a third film cutback; and
   a fifth distance between a fourth edge of the film and the fourth edge of the lamination stack, wherein the fifth distance comprises a fourth film cutback.

9. The method according to claim 8, wherein the third film cutback is substantially the same as the fourth film cutback.

10. The method according to claim 8, wherein the film shrinks more in a direction between the first film edge and the second film edge than a direction between the third film edge and the fourth film edge.

11. The method according to claim 10, wherein the first film cutback and the second film cutback are equal to or greater than the third film cutback and the fourth film cutback.

* * * * *